United States Patent [19]

Martyniuk

[11] 4,283,207

[45] Aug. 11, 1981

[54] DIESEL EXHAUST FILTER-INCINERATOR

[75] Inventor: Ernest T. Martyniuk, Troy, Mich.

[73] Assignee: General Motors Corporation, Detroit, Mich.

[21] Appl. No.: 161,032

[22] Filed: Jun. 19, 1980

[51] Int. Cl.³ ........................ B01D 46/24; B01D 46/42

[52] U.S. Cl. ........................................ 55/282; 55/521; 55/523; 55/DIG. 30; 60/311

[58] Field of Search ................. 55/282, 301, 521, 523, 55/DIG. 10, DIG. 30; 60/275, 286, 311

[56] References Cited

U.S. PATENT DOCUMENTS

| | | | |
|---|---|---|---|
| 3,043,096 | 7/1962 | McLoughlin | 55/DIG. 10 X |
| 3,268,080 | 8/1966 | Eberly, Jr. | 55/DIG. 10 X |
| 3,937,015 | 2/1976 | Akado et al. | 60/311 X |
| 4,205,971 | 6/1980 | Abthoff et al. | 55/DIG. 30 X |

*Primary Examiner*—Kathleen J. Prunner
*Attorney, Agent, or Firm*—Robert J. Outland

[57] ABSTRACT

A diesel engine exhaust particulate filter-incinerator comprising an enclosed filter panel having particulate deposition surfaces bordered by electrodes of a high voltage power supply. Periodic incineration is accomplished by the collection on the surfaces of particulates in amounts sufficient to conduct sufficient electric current along paths through the particulates to heat them to incineration temperature. Ignition and burn off of particulates may be automatically accomplished by maintaining a suitable voltage across the electrodes at the edges of the collection surfaces to initiate arc-like current flow before the collected particulates reach a level that would plug the filter. Specific embodiments of exemplary filter constructions are disclosed.

5 Claims, 5 Drawing Figures

DIESEL EXHAUST FILTER-INCINERATOR

TECHNICAL FIELD

This invention relates to exhaust filters for diesel engines and the like and more particularly to diesel exhaust filter units provided with high voltage electrical means for incinerating collected particulates on the filter surfaces.

BACKGROUND

Among various types of devices being considered for removing particulates from the exhaust gases of automotive engines, and particularly diesel engines, are various types of exhaust gas filters including throw-away and incineration cleanable types. Various filter constructions and incineration systems have been proposed which include methods of incineration control having varying degrees of complexity and incineration systems requiring various levels of energy consumption.

SUMMARY OF THE INVENTION

The present invention provides an extended life particulate filter construction in which incineration cleaning of the filter may be accomplished without a control system to initiate and stop the electrical cleaning cycle and in which only limited energy consumption is required for filter cleaning. These and other features and advantages of the invention will be more fully understood from the following description of certain preferred embodiments taken together with the accompanying drawing.

BEST MODE DISCLOSURE

Figures 1, 2:
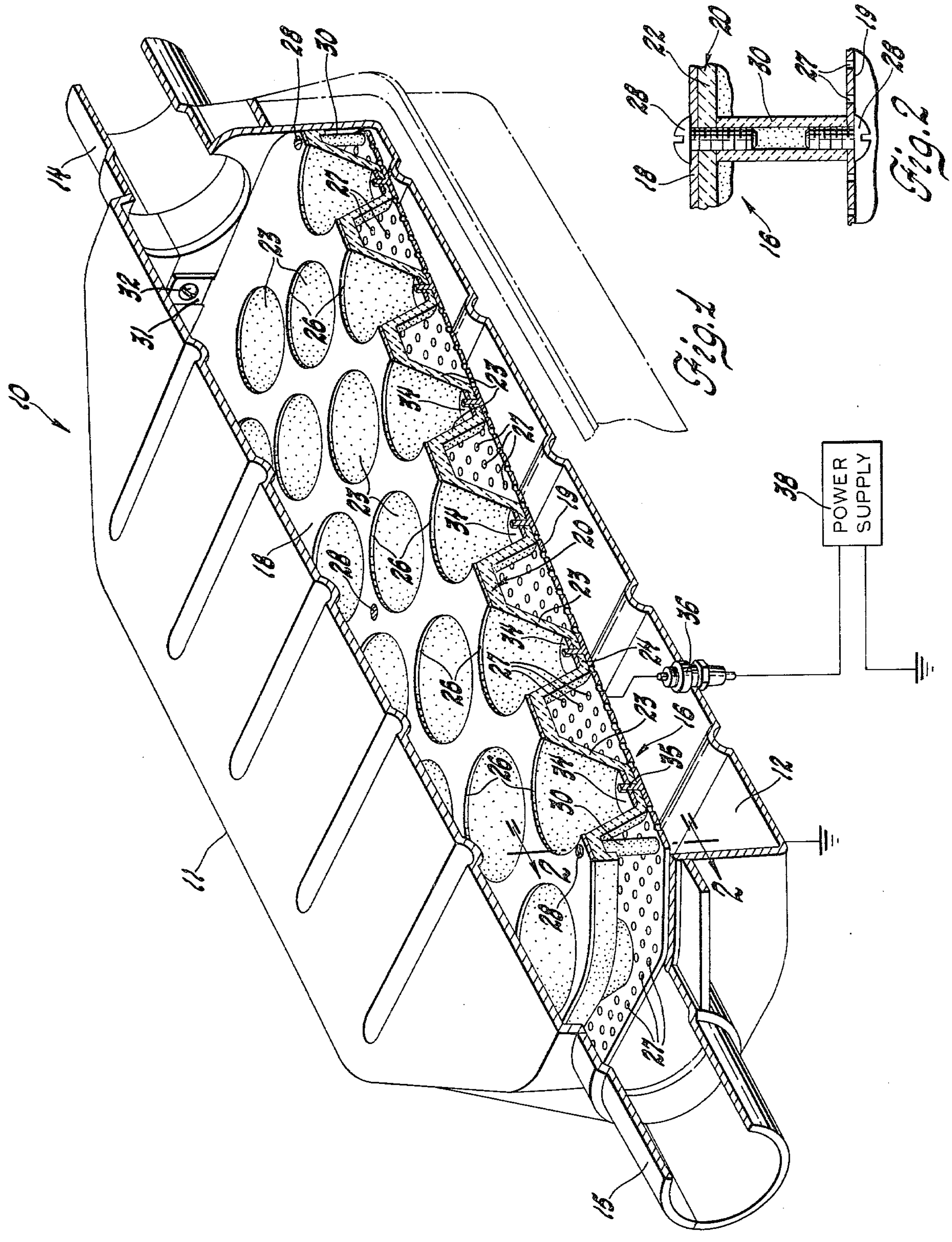
FIG. 1 is a pictorial view partially cut away to show the interior construction of a diesel engine exhaust filter formed in accordance with the invention.
FIG. 2 is an enlarged cross-sectional view of filter element retaining means as viewed from the plane indicated by the line 2—2 of FIG. 1.
Figure 3:
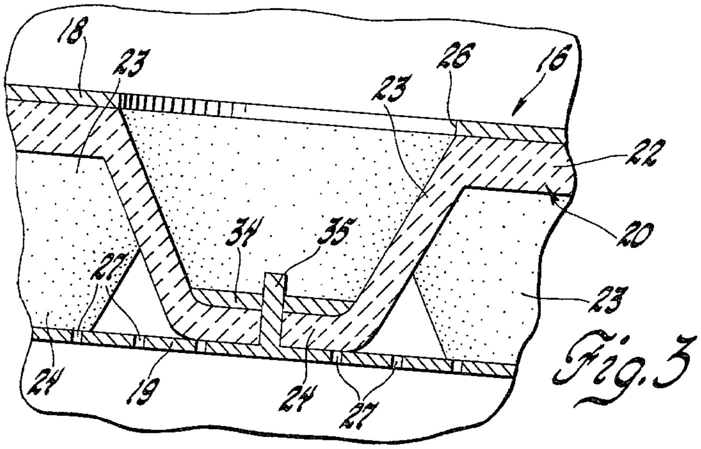
FIG. 3 is an enlarged cross-sectional view through one of the conical filter portions of the filter element of FIG. 1.

Referring first to the filter embodiment shown in detail in FIGS. 1-3 of the drawings, numeral 10 generally indicates a diesel engine exhaust filter formed in accordance with the invention. Filter 10 includes a housing 11, preferably formed of sheet metal and having a generally elongated flattened configuration defining an internal chamber 12. An inlet connector 14 and an outlet connector 15 disposed at opposite ends of the housing provide means for connecting the filter in the exhaust system of a diesel engine powered vehicle and providing for the passage of exhaust gases into and out of the internal chamber 12.

Within the housing 11 and extending diagonally within the internal chamber 12 is a filter element generally indicated by numeral 16. Element 16 includes upper and lower plate members 18, 19 respectively having secured between them a preformed fibrous ceramic filter panel 20.

The filter panel is preferably formed of commercially available high-temperature ceramic filter materials shaped to define an upper supporting wall 22 from which depend a plurality of spaced conical filter walls 23 that terminate in flattened or rounded apices 24. The upper plate member 18 lies along and covers the upper supporting wall portion 22 of the filter panel 20 and is provided with a plurality of circular openings 26. The edges of the openings 26 are aligned with the upper edges of the conical filter walls 23 so as to permit gas flow through the upper plate member and into the filter surfaces of the conical walls 23.

The lower plate member 19 extends along and engages the apices 24 of the conical filter walls. The lower plate is perforated with a large number of small openings 27 which permit gas flow passing through the conical filter walls to continue through the lower plate member 19 into the lower portion of the housing chamber 12.

The main components of the filter element so far described are maintained in an assembly by screw fasteners 28 which extend through the upper and lower plate members 18, 19 and the upper supporting wall 22 of the filter panel to threadably engage hardened ceramic insulators 30. The insulators 30 act as spacers to hold the upper and lower plate members in properly spaced relation and maintain the filter panel sandwich fashion between the plate members. The insulators also electrically separate the upper and lower plate members 18, 19 from one another for a purpose to be subsequently described.

The filter element 16 is supported within and extends diagonally across the chamber 12 of the filter housing. The upper plate member 18 is suitably secured to the housing 11 in any electrically conductive manner, such as by tabs 31 and fasteners 32. The filter element is so located within the chamber that exhaust gas delivered through the inlet connector 14 is distributed above the upper plate member 18 from which it passes downwardly through the conical filter walls, on the inner surfaces of which exhaust particulates are collected. The cleaned exhaust gas continues downwardly through the openings 27 of the perforated lower plate member into the lower portion of the chamber 12 from which it is exhausted through the outlet connector 15.

In order to provide for electrical incineration cleaning of particulates from the conical filter wall surfaces, the apices 24 of the filter walls are provided with disc-like internal electrodes 34 which may be slightly dished or cup-shaped. Electrodes 34 are disposed internally of the apices 24 and are electrically connected, through suitable means such as pins 35, with the perforated lower plate member 19. The latter is supported in electrical isolation from the upper plate member 18 and the housing 11 and is electrically connected through an insulated connector 36 with an external high voltage power supply 38.

Through suitable grounding of the power supply and of the housing 11, the upper plate member 18 is electrically charged by the power supply with a polarity opposite to that of the disc-like electrodes 34 at the apices of the conical filter walls. Thus when the power supply is in operation, a high voltage electrical charge is applied across the surfaces of the conical filter walls between the disc-like electrodes 34 at the apices and the edges of the upper plate circular openings which lie along the upper edges of the conical filter walls.

In operation of the described filter assembly, the power supply 38 may be continuously operated with very little expenditure of energy since current will not flow between the electrodes formed by the upper plate 18 and the discs 34 unless a sufficiently conductive material is present on the inner surfaces of the conical filter walls between the electrodes. During operation of the associated diesel engine, particulates, largely carbonaceous in nature, are collected on the inner surfaces of the conical filter walls 23. These build up to a level at which, at one or more points, a sufficient level will be reached to initiate a flow of electric current between the electrodes 34, 18 which is of sufficient magnitude to heat and incinerate the particulates through which the electrical current is passed. In this manner, arc-like current flows intermittently through the collected particulates over various portions of the surfaces of the conical filter walls, cleaning off the particulates collected on the walls as they build up to levels sufficiently great to provide paths for electric current flow.

The excess air in the exhaust gases of a diesel engine is sufficient to provide the necessary oxygen for combustion of the carbonaceous particulates whenever the passage of the electrical current heats them sufficiently for this purpose. Thus, the exhaust filter continuously and automatically operates to clean excessive levels of collected particulates from the filter walls, keeping the filter surfaces open for the continuous filtering of exhaust particulates from the engine exhaust gases over an indefinitely extended period.

A filter of the type described may be constructed using commercially available materials suitable for the requirements. For example, the housing and the upper and lower plate members may be formed of any suitable medium or high temperature steels that have adequate corrosion resistance, such as, for example, low alloy or stainless steels.

The filter panel may be formed of fine porosity ceramic filter material such as compressed ceramic fibers available for operation at temperatures of 1800° F. and above. Examples are fibers formed of equal amounts of aluminum and silicon oxides capable of temperatures up to 1800° F., fibers with 2% added boro-silica capable of 2300° F. and 100% aluminum oxide fibers capable of operating at temperatures up to 3000° F.

While the power supply and its connections may be selected to suit the particular conditions encountered, tests of an embodiment similar to that described indicated that an operating voltage of about 4000 volts at a power of 200 watts may be adequate for cleaning a filter panel of the type described under common conditions of engine operation.

Figure 4:
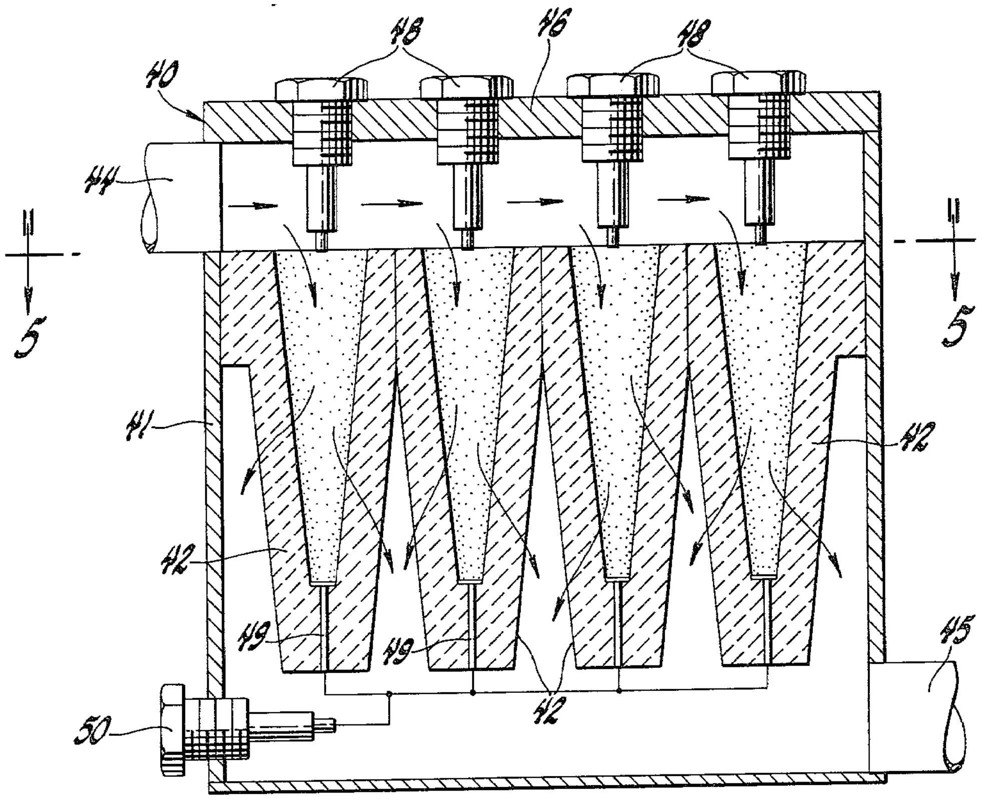
FIG. 4 is a cross-sectional view through an alternative embodiment of filter element formed in accordance with the invention.
Figure 5:
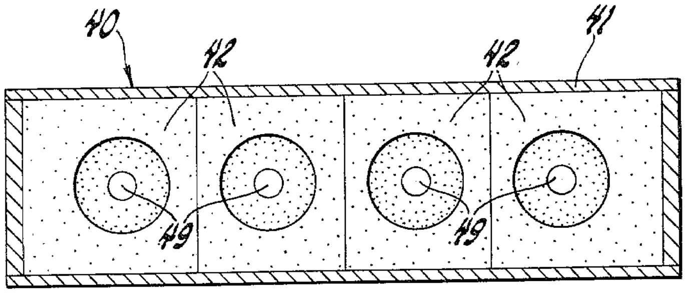
FIG. 5 is a cross-sectional view of the alternative filter embodiment as viewed from the plane indicated by the line 5—5 of FIG. 4.

Referring now to FIGS. 4 and 5 of the drawings, there is illustrated an alternative embodiment of diesel exhaust filter formed in accordance with the invention and generally indicated by numeral 40. Filter 40 includes a housing 41 in which is supported an assembly of conical filter elements 42 formed of suitable porous high temperature ceramic. An inlet connector 44 admits uncleaned exhaust gases into the upper portion of the housing from which they pass downwardly through the cone shaped filter elements into the lower housing portion from which they are exhausted through an outlet connector 45.

A cover 46 supports a plurality of electrodes 48 which extend downwardly inside the housing to points near the centers of the large ends of the various conical filter elements. Cooperating electrodes 49 are disposed at the narrow ends or apices of the filter elements 42 and are electrically connected with an electrical fitting 50 mounted in the housing 41. Fitting 50 and electrodes 48 are electrically connected to opposite ends of a suitable high voltage power supply, not shown, of the sort described with respect to the first described embodiment.

In operation of the embodiment of FIGS. 4 and 5, engine exhaust gas is passed from the inlet connector 44 through the conical filters 42 and out the outlet connector 45 leaving particulates deposited on the inner conical surfaces of the filter elements. At the same time, a high voltage charge is applied between the electrodes 48 and 49 at each filter element. When a sufficient level of particulates have been collected on the filter surfaces, the high voltage causes electric arcs to form between the electrodes 48 and the walls of their associated filter elements resulting in current flow through and ignition of the particulates collected along the filter walls. Ideally, the conical shape of the filter walls is selected and the voltage of the power supply chosen so that burn off of the particulates will begin some time before they cause an undue restriction of gas flow through the filter elements. Having begun, an arc initiated at the top of a conical filter will continue moving downwardly along the filter wall until, at a point near the lower apex portion, the arc length will become excessive and current flow will cease until such time as the collection of particulates again becomes excessive.

While the invention has been described by reference to certain specific embodiments chosen for purposes of illustration, it should be apparent that numerous changes could be made within the scope of the inventive concepts described. Accordingly, it is intended that the invention not be limited to the specific features illustrated but that it have the full scope permitted by the language of the following claims.

The embodiments of the invention in which an exclusive property or privilege is claimed are defined as follows:

1. In a particulate trap for collecting and burning combustible particulates, the combination comprising a high temperature electrically insulative filter medium positioned across a gas flow path and capable of collecting on an upstream facing surface substantial amounts of electrically conductive combustible particulates borne by gas passed through the filter medium and capable of defining a current flow path between spaced points on said surface, means for applying between said spaced points of the filter medium surface a sufficient electric voltage to cause an arc-like current to pass through collected conductive particulates on said filter surface between said spaced points, whereby substantial collections of combustible particulates on the filter surface are removed by incineration and electrical power is consumed by the apparatus only during the incineration of particulates.

2. In a particulate trap for collecting and burning combustible particulates, the combination comprising a high temperature electrically insulative filter medium positioned across a gas flow path and capable of collecting on an upstream facing surface substantial amounts of electrically conductive combustible particulates borne by gas passed through the filter medium and capable of defining current flow paths between spaced locations on said surface electrodes positioned adjacent spaced locations of the filter medium surface such that upon application of a sufficient electric voltage an electric current will be passed through significant collections of conductive particulates lying between the electrodes on the filter surface, and means for connecting said electrodes to an electrical source of sufficient power and voltage to cause an arc-like current to pass through collected conductive particulates on said filter surface between the electrodes, whereby substantial collections of combustible particulates on the filter surface are removed by incineration and electrical power is consumed by the apparatus only during the incineration of particulates.

3. The combination of claim 2 wherein said upstream facing surface of the filter medium is of conical configuration and said electrodes are disposed at the apex and at the distal edges of the conical surface.

4. The combination of claim 3 wherein one of said electrodes comprises the inner edge of a gas passage defining opening in a metal plate wherein said edge lies against the edges of the conical surface distal from the apex.

5. The combination of claim 3 wherein one of said electrodes projects to a point centered between the edges of the conical surface distal from the apex.

* * * * *